UNITED STATES PATENT OFFICE 2,331,812

WATER INSOLUBLE AZO DYESTUFFS AND FIBER DYED THEREWITH

Norbert Steiger and Fred Haarde, Lock Haven, Pa., assignors to American Aniline Products, Inc., New York, N. Y., a corporation of New York No Drawing. Application February 5, 1942, Serial No. 429,650

10 Claims.  (Cl. 260—176)

The present invention relates to the production of bright yellow dyestuffs and to fiber dyed therewith. More particularly, it relates to dyestuffs of the following general formula:

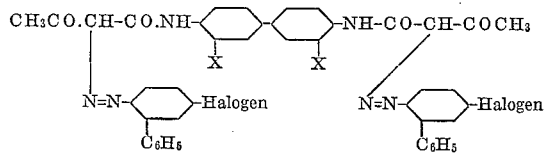

wherein X represents hydrogen or methyl group.

The azo dyestuffs of the invention are insoluble in water and possess vivid yellow tints of very good fastness. They may be obtained by coupling in substance or by coupling on the fiber to be dyed, or on a substratum for the production of lakes, a diazonium compound from an amine of the following constitution:

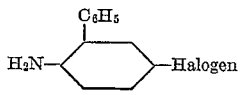

with diacetoacetylarylides of the general formula—

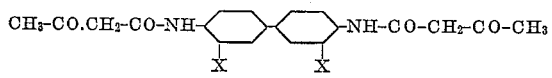

wherein X represents hydrogen or methyl group.

The dyestuff made, for instance, by coupling the diazo compound from 2 amino-5 chlor diphenyl with diacetoacetyl-O-tolidine on the fiber produces a beautiful, bright greenish yellow shade unexcelled by any other practically used base in combination with this widely employed yellow naphthol.

The following example is given by way of illustration but not in limitation of the invention:

Well boiled and dried cotton yarn is impregnated with a solution per liter 10 grams of diacetoacetyl-O-tolidine, 10 cc. caustic soda solution (38%) and 12.5 cc. of the solvent known by commercial name "Cellosolve" (ethylene glycol monoethyl ether). The solution is then well centrifuged.

Then without being dried, the cotton goods is treated with a solution containing per liter the stable salt of the diazo compound of 2.04 grams of 2 amino-5 chlor diphenyl. It is then well rinsed and soaped.

In this manner there is obtained on the fiber the dyestuff of the formula—

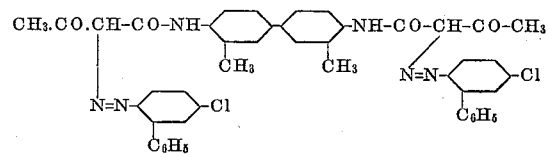

The dyestuff dyes a beautiful, bright greenish yellow of very good fastness to light, washing, peroxide, chlorine, and open kier boil.

If diacetoacetyl-benzidine is used instead of diacetoacetyl-O-tolidine, a very bright greenish yellow of very good fastness is obtained. In this case the shade of the yellow dyestuff is greener than if the O-tolidine derivative is used.

Likewise, instead of the diazo compound of 2 amino-5-chlor diphenyl, the diazo compound of 2 amino 5 bromo diphenyl may be used with diacetoacetylarylides and bright yellow azo dyestuffs are obtained that possess similar properties.

Having thus described our invention, what we claim is:

1. The water-insoluble azo dyestuffs of the following general formula:

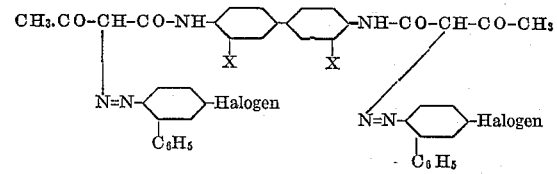

wherein X means hydrogen or methyl group, yielding, when produced on the fiber, vivid yellow dyeings of very good fastness properties, particularly of very good fastness to light and to washing.

2. The water-insoluble azo dyestuffs of the following general formula:

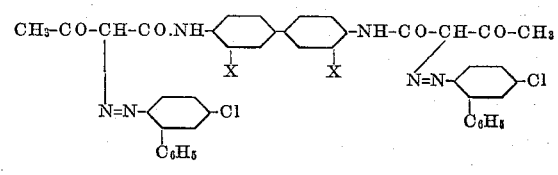

wherein X means hydrogen or methyl group, yielding, when produced on the fiber, vivid yellow dyeings of very good fastness properties, particularly of very good fastness to light and washing.

3. The water-insoluble azo dyestuff of the following formula:

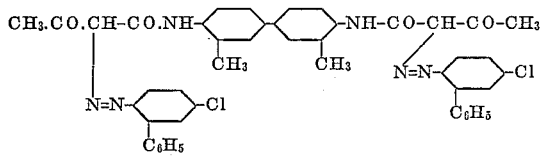

yielding, when produced on the fiber, a bright greenish yellow of very good fastness to light, washing, peroxide, chlorine and open kier boil.

4. The water-insoluble azo dyestuff of the following formula:

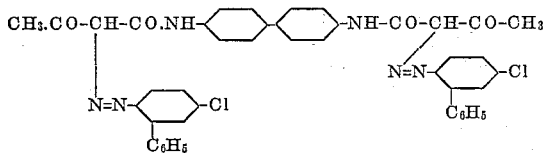

yielding, when produced on the fiber, a bright greenish yellow of very good fastness properties.

5. The water-insoluble azo dyestuffs of the following general formula:

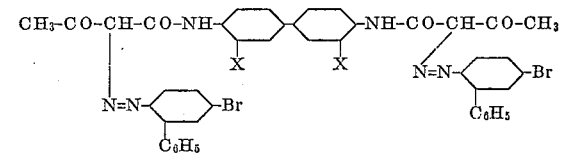

wherein X means hydrogen or methyl group yielding, when produced on the fiber, bright greenish yellow shades of very good fastness properties.

6. Fiber dyed with the dyestuffs as claimed in claim 1.

7. Fiber dyed with the dyestuffs as claimed in claim 2.

8. Fiber dyed with the dyestuff as claimed in claim 3.

9. Fiber dyed with the dyestuff as claimed in claim 4.

10. Fiber dyed with the dyestuffs as claimed in claim 5.

NORBERT STEIGER.
FRED HAARDE.